Oct. 30, 1951 E. BERGER 2,572,974
CONTROL ELEMENT FOR PLURAL HYDRAULIC MOTOR SYSTEMS
Filed June 16, 1949 3 Sheets-Sheet 1

INVENTOR
ERNEST BERGER
BY
Raymond G. Muller
ATTORNEY

Oct. 30, 1951   E. BERGER   2,572,974
CONTROL ELEMENT FOR PLURAL HYDRAULIC MOTOR SYSTEMS
Filed June 16, 1949   3 Sheets-Sheet 2
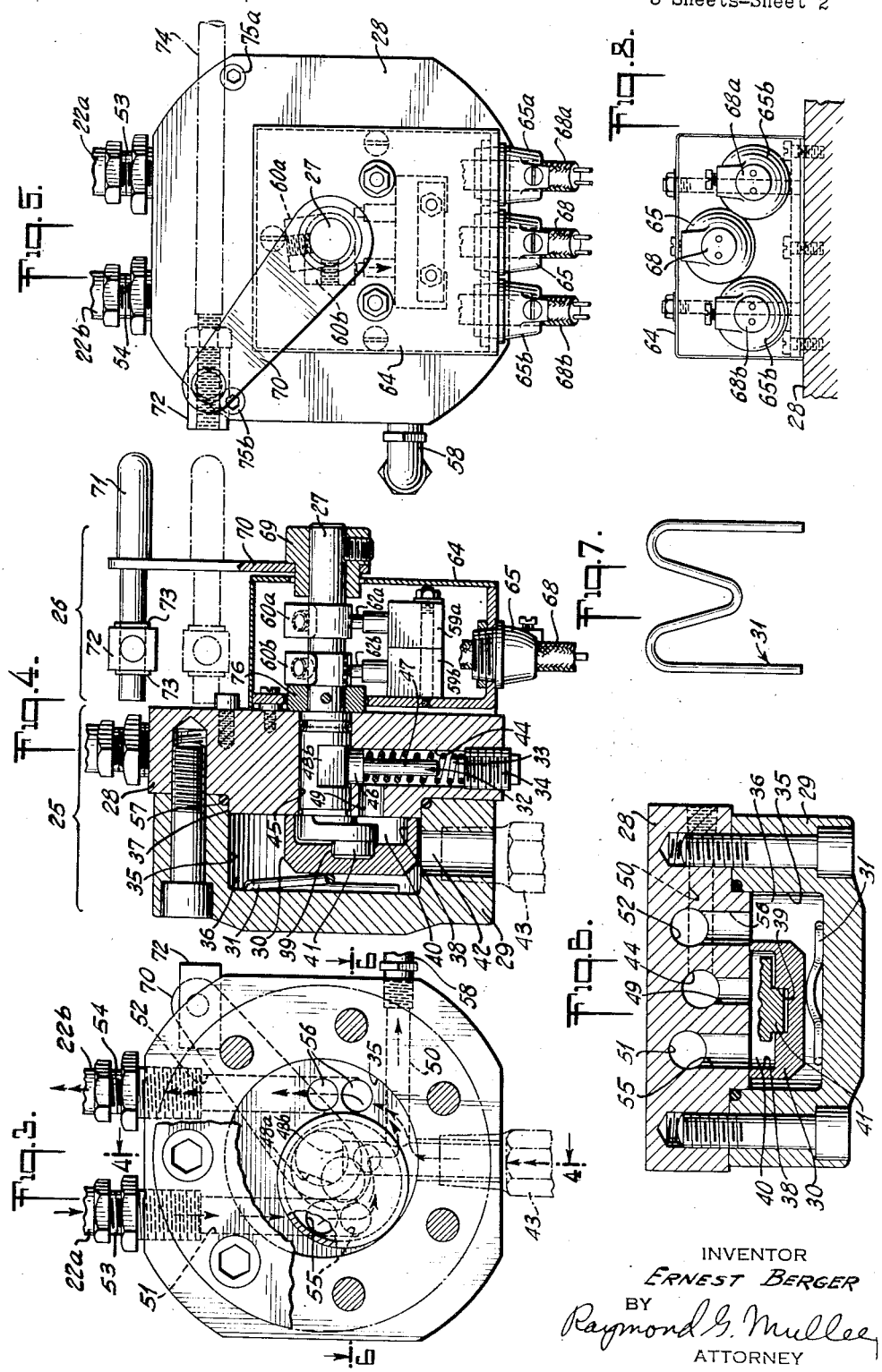
INVENTOR
*ERNEST BERGER*
BY
*Raymond G. Muller*
ATTORNEY Oct. 30, 1951 E. BERGER 2,572,974
CONTROL ELEMENT FOR PLURAL HYDRAULIC MOTOR SYSTEMS
Filed June 16, 1949 3 Sheets-Sheet 3
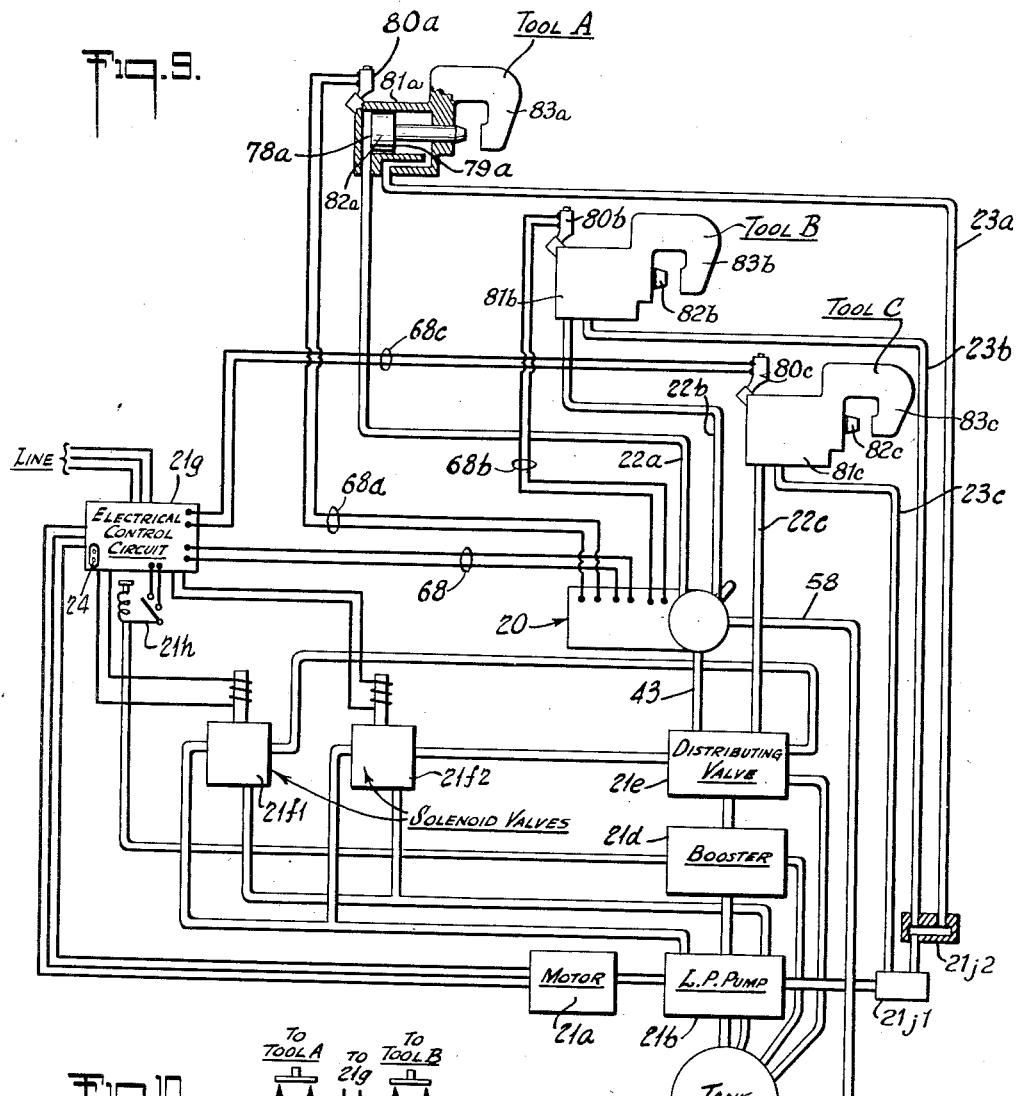
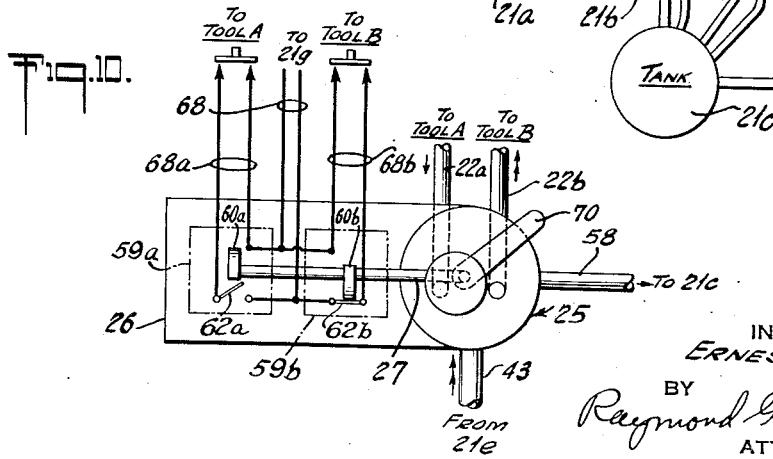
INVENTOR
ERNEST BERGER
BY
Raymond G. Mullen
ATTORNEY Patented Oct. 30, 1951

2,572,974

UNITED STATES PATENT OFFICE 2,572,974

CONTROL ELEMENT FOR PLURAL HYDRAULIC MOTOR SYSTEMS

Ernest Berger, Detroit, Mich., assignor to Chicago Pneumatic Tool Company, New York, N. Y., a corporation of New Jersey Application June 16, 1949, Serial No. 99,401

6 Claims. (Cl. 60—52)

This invention relates to a mechanical system, and more particularly to a control element for use in a mechanical system.

The control element comprises a combination of fluid control valves and electric switches adapted to provide operative connection between either of two fluid operated tools associated with a single source of pressure fluid supply. As will later be apparent, the control element of the invention is adaptable for use in any mechanical system having a hydraulic power source for operation of a plurality of work tools of varied type, however, the invention will be described as applied to a mechanical system including a plurality of tools comprising a riveting system. Briefly, the riveting system comprises a plurality of riveting tools all of which are supplied by a single hydraulic power plant. The power plant is adapted to deliver a flow of high pressure fluid to one of the riveting tools during the first part of the tool riveting cycle; to automatically cut off the flow of high pressure fluid upon attainment of a predetermined riveting pressure; and to deliver a flow of low pressure fluid to the riveting tool during the latter part of the tool riveting cycle. The tool riveting cycle is initiated by closing an electric switch located on the riveting tool, and since the power plant is arranged to furnish pressure fluid for only one riveting tool or cycle at a time, the tool upon which the electric switch is first closed will operate for one riveting cycle, to the exclusion of the other tools. The structure and function of such a riveting system will be set forth in greater detail hereinafter. By means of the invention the number of riveting tools associated with the power plant can be increased, without the necessity of altering the internal arrangement of the power plant.

An object of the invention is to provide a riveting system having a control element which will establish operative connection between either of two fluid operated tools associated with a single source of pressure fluid supply.

Another object of the invention is to provide a control element which will increase the number of riveting tools associated with a single hydraulic power plant wihout the necessity of altering the internal arrangement of the power plant.

A further object of the invention is to provide an assembly comprising a novel combination of fluid control valves and electric switches, the assembly being adapted for the positive and efficient achievement of the objects set forth hereabove.

Other objects and features of the invention will be apparent from the following description when read in conjunction with the accompanying drawings, wherein:

Fig. 3 is a side view, on a still larger scale, of the control element with a major portion of the valve cap removed, and showing a disc valve and actuating lever of the invention in first operative position;

Fig. 4 is a sectional view of the control element taken in general along line 4—4 in Fig 3, and showing the operative parts in mid-position;

Fig 5 is a side view of the control element taken on the side opposite that shown in Fig. 3;

Fig. 6 is a sectional view of the control element as taken generally along line 6—6 in Fig. 3;

Fig. 7 is a plan view of a valve disc spring used in the control element;

Fig. 8 is a bottom view of the switch housing portion shown in Figs. 4 and 5;

Fig. 9 is a diagrammatic illustration showing the general hook-up of the control element to the riveting system as described in connection with the invention, and Fig. 10 is a diagrammatic illustration of the control element showing the operative relationship between the parts thereof.

Figure 1:
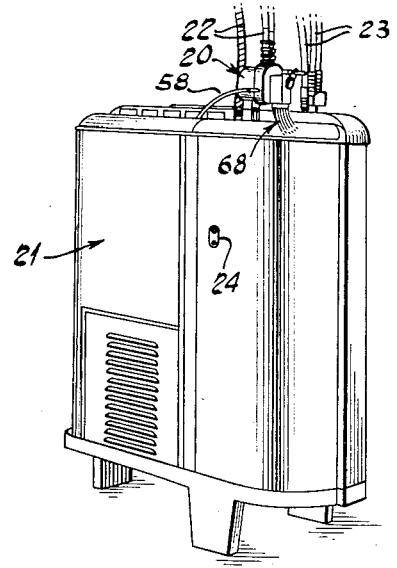
Fig. 1 is a perspective view in reduced scale, showing the control element mounted on a hydraulic power plant of the type as will be described in connection with the invention.

Referring now to Fig. 1, the control element, generally indicated by number 20, is shown mounted on the upper side of a hydraulic power plant 21. The power plant 21 is adapted to deliver a flow of high pressure fluid, preferably oil, to the high pressure side of any one of a plurality of riveting tools by way of hose 22, and a flow of low pressure fluid to the low pressure side of any one of said riveting tools by way of hose 23. The power plant is a self contained unitary structure which can be easily moved to the most convenient location relative the work. A push button control switch 24 conditions the power plant for operation.

Figure 2:
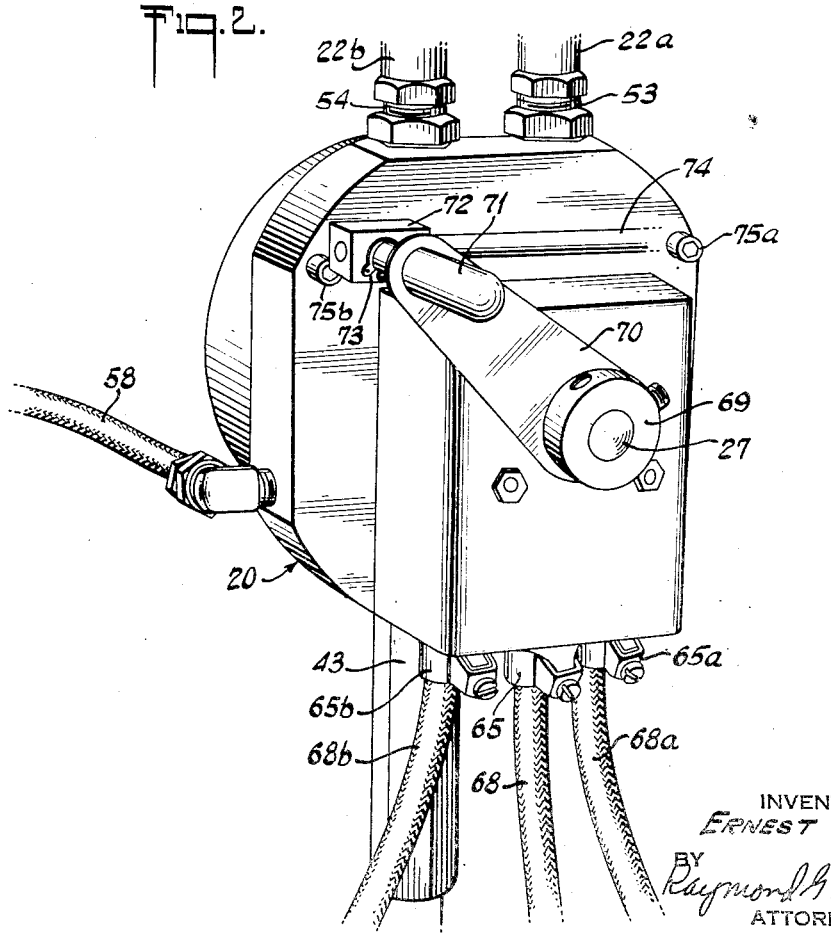
Fig. 2 is a perspective view of the control element on a larger scale than Fig. 1.

As best seen in Figs. 2 and 4, the control element 20 basically comprises a fluid valve portion 25, a switch housing portion 26 and an actuating shaft 27, which is arranged in part within each of the portions.

The fluid valve portion 25 comprises a valve body 28, a valve cap 29 bolted to one side of the valve body, a valve disc 30, a valve disc spring 31, and an actuating shaft holding or detent assembly consisting of a detent plunger or pin 32, a detent pin spring 33, and a pipe plug 34. Valve cap 29 has a counter bore 35 which forms a valve chamber 36 when the valve cap is positioned on a boss 37 formed on the side of the valve body 28. Valve disc 30 is formed with two contiguous and concentrically arranged counterbores, the larger counterbore 38 extending from one side to a depth of almost one half the thickness of the valve disc, while the smaller counterbore 39 continues into the valve disc approximately one half the remaining thickness thereof. The valve disc 30 is located in valve chamber 36, and spring 31, positioned between the valve cap 29 and the solid side of the valve disc urges the counterbored side of the valve disc against the side of the valve body 28 to form an enclosed chamber 40. Enclosed within the chamber 40 is an end of the actuating shaft 27 which is in the form of a crank, an offset hub portion 41 thereof extending into the smaller counterbore 39 of the valve disc 30.

It will be seen that when the shaft 27 is rotated, the valve disc 30 will be caused to travel in a circular path about the main axis of shaft 27. A passageway 42, extending from the valve chamber 36 through the lower wall of the valve cap 29, is threaded to receive a nipple 43.

The actuating shaft detent assembly is positioned in a bore 44 located in the lower portion of the valve body 28, the upper end of bore 44 opening into a transverse bore 45 which positionally maintains the shaft 27, the lower end of the bore being threaded to receive the pipe plug 34. Detent pin 32 has a head portion 46 of diameter slightly less than the diameter of bore 44, and a stem portion 47. The pin spring 33 surrounds the stem portion 47 and is compressively maintained between the underside of the head portion 46 and the pipe plug 34, to force the topside of the head portion 46 against either of two flats 48a or 48b formed on the shaft 27. By means of the shaft detent assembly, the shaft 27 is readily maintained in either of two operative positions.

A short passageway 49 inter-connects chamber 40 of valve disc 30 and the bore 44. Another passageway 50, which serves as a fluid return passageway, extends from the bore 44 to the side of the valve body 28, the outer end of the passageway 50 being threaded to receive a pipe connection.

In the upper portion of the valve body 28, are arranged at equal distances on each side of the center line thereof, two vertically extending parallel passageways 51 and 52, the upper ends of which are threaded to receive hose connections 53 and 54 respectively. At the lower ends of each passageway are two short transverse passageways 55 and 56, which connect the passageways 51 and 52 to the valve chamber 36. It will be seen (Fig. 3) that passageways 55 and 56 are symmetrically positioned with respect the centerline of valve body 28, and are further arranged so that the enclosed chamber 40 of valve disc 30, will cover only passageways 55 when shaft 27 is in a first operative position, and only passageways 56 when shaft 27 is in a second operative position. Hose connections 53 and 54 affix hose 22a and 22b respectively to the valve body 28. A return flow pipe 58 connects passageway 50 with the appropriate portion of the hydraulic power plant 21. Gasket 57 arranged about the periphery of boss 37, assures a fluid tight joint between valve cap 29 and the valve body 28.

An analysis of the liquid flow circuits afforded by the structure of the fluid valve portion 25, shows that when the shaft 27 is positioned in first operative position (Figs. 3 and 5), high pressure fluid can flow from the hydraulic power plant 21, through nipple 43 and passageway 42 into valve chamber 36, then through passageways 56 and 52, connection 54 to hose 22b and onward to the high pressure side of riveting tool B. At the same time, fluid returning from the high pressure side of riveting tool A passes through hose 22a and pipe connection 53, through passageways 51 and 55, into the valve disc chamber 40 then through passageway 49, bore 44, passageway 50 and onward through pipe 58 to the hydraulic power plant 21. When shaft 27 is positioned in second operative position (flat 48a of shaft 27 in contact with the topside of detent pin head portion 46) high pressure fluid can flow from the hydraulic power plant 21, through nipple 43 and passageway 42 into valve chamber 36, then through passageways 55 and 51, hose connection 53 to hose 22a and onward to the high pressure side of riveting tool A. At the same time fluid returning from the high pressure side of riveting tool B, passes through hose 22b and hose connection 54, through passageways 52 and 56, into valve disc chamber 40, then through passageway 49, bore 44, passageway 50 and onward through pipe 58 to the hydraulic power plant 21. It is pointed out that the valve disc 30 should not be shifted from one operative position to another during the working cycle of a riveting tool, in other words, when high pressure fluid is being admitted to valve chamber 36.

The switch housing portion 26 comprises a pair of electric switches 59a and 59b, preferably similar to those known to the trade as microswitches, and in this instance, being single pole, single throw type with normally open contacts, a pair of switch cams 60a and 60b which are adjustably positioned on the shaft 27 to operate switches 59a and 59b respectively by way of switch plungers 62a and 62b, a housing 64 which is affixed to the side of the valve body 28 by bolt means or equivalent, and three electrical cable collars 65, 65a, 65b for the support of electric cables 68, 68a and 68b respectively, the collars being removably affixed to the lower surface of housing 64. Each cable collar is equipped with a clamping screw for securing the cable to the collar. The switches 59a and 59b are firmly bolted to the inner side of the housing 64. A glance at Fig. 9 shows that cables 68a and 68b are connected to a control switch of riveting tools A and B respectively, while cable 68 is connected to the electrical control circuit of hydraulic power plant 21.

Shaft 27 projects from the housing 64 and has removably affixed to the end thereof a hub 69 to which is welded a lever 70. At the end of the lever and projecting from each side, is a handle 71. If it is desired to manipulate the control element 20 from some distance away, the inner part of the handle 71 can have a block 72 rotatably mounted thereon, which block is maintained against lateral movement by means of snap rings 73 affixed to the handle 71. Block 72 is threaded to receive a rod 74 of any practical or required length. The angular movement of lever 70 is regulated by means of cap screws 75a and 75b threadably affixed to the valve body 28, the head of the cap screws serving to engage the inner end of handle 71. A collar 76 is adjustably affixed to the shaft 27, one side of the collar being in contact with the wall of valve body 28, to limit lateral movement of the shaft in one direction, while a hub of the shaft crank portion limits lateral movement of the shaft in the opposite direction, all as is clearly shown in Fig. 4.

It can be seen that by proper adjustment of the lever 70 and switch cams 60a and 60b, relative to shaft 27, movement of the lever 70 to first operative position will result in the shaft flat 48b being in full contact with the top side of detent pin head 46 at the same time that cam 60b maintains the contacts of switch 59b closed, while movement of the lever to second operative position will result in shaft flat 48a being in full contact with the top side of the detent pin head 46 at the same time that cam 60a maintains contacts of switch 59a closed.

An analysis of the control element 20 with respect the cooperative functions of the fluid valve portion 25 and the switch housing portion 26, both as set forth in detail heretofore, and with particular reference to Fig. 10, shows that when the lever 70 is in first operative position as indicated, high pressure fluid (double headed arrows) can flow from nipple 43, through valve portion 25 to hose 22b and onward to the high pressure side of tool B, while reduced pressure fluid (single headed arrows) can return from the high pressure side of tool A through hose 22a and the valve portion 25 through pipe 58; in first operative position electric switch 59b is closed thereby connecting cables 68 and 68b. In second operative position (not shown), high pressure fluid can flow through nipple 43 through valve portion 25 to hose 22a and onward to the high pressure side of tool A, while reduced pressure fluid can return from the high pressure side of tool B through hose 22b and the valve portion 25 to pipe 58; in second operative position electric switch 59a is closed thereby connecting cable 68 and 68a.

Turning now to a consideration of the control element 20 as applied to the riveting system under discussion, Fig. 9 shows a plurality of riveting tools namely A, B and C, associated with a hydraulic power plant 21 whose basic parts are diagrammatically illustrated. The operation of riveting tools A or B, is dependent primarily on the setting of control element 20, i. e., tool A can operate only when the lever 70 is in second operative position, while tool B can operate only when the lever 70 is in first operative position. The operation of tool C is independent of control element 20, however as previously mentioned and as will be more clearly realized hereinafter, tool C cannot operate while either of the other tools are in operation, and vice versa.

The riveting tools are of simple construction, the illustrative tools comprising a cylinder 81 (a, b, c), a piston assembly 82 (a, b, c) which includes a piston rod or plunger, as is well known in the art, and a yoke 83 (a, b, c). As is seen in Fig. 9 (tool A), the piston has two effective areas, a head end 78 (a, b, c) and a rod end 79 (a, b, c), either end to which pressure fluid can be selectively applied to effect piston movement. For sake of convenience, the volume formed by the head end of the piston and the interior of the cylinder will be referred to as a "high pressure volume," since high pressure fluid is admitted to said volume, while the volume formed by the rod end of the piston and the interior of the cylinder, will be referred to as a "low pressure volume," since low pressure fluid is admitted thereto. When a piston is being moved forward, the low pressure fluid in the low pressure volume is forced back to the power plant 21 by way of hose 23, and when the piston is being moved rearward, the high pressure fluid in the high pressure volume is automatically depressurized by action of the power plant, and is returned to the power plant by way of hose 22. A switch 80 (a, b, c) of the single pole, single throw type having normally open contacts, is positioned on each tool, a cable 68 connecting the switch with the electric control circuit of the power plant. The high pressure fluid circuit, as well as the electric circuit of tools A and B, are connected with the power plant 21, by way of the control element 20, while the low pressure fluid circuit of said tools is connected directly to the power plant by way of hose 23.

The major elements of the hydraulic power plant are an electric motor 21a, a low pressure pump 21b which is driven by the motor, a reservoir or tank 21c which supplies liquid to the pump and receives liquid from various elements of the power plant, a booster 21d including a differential piston which upon movement is caused to pressurize the liquid flowing from the pump 21b, a distributing valve 21e which is connected to the booster, a pair of solenoid valves 21f1 and 21f2 which are adapted upon electrical actuation to allow passage of liquid from the pump 21b to the distributing valve 21e to condition said valve for flow of liquid therethrough to nipple 43 or hose 22c respectively, and an electrical control circuit 21g comprising solenoid switches, relays, transformers and other well known electrical elements, all being connected to effect desired operation of the hydraulic power plant. Manifold blocks 21j1 and 21j2 are arranged for connection of the hose(s) 23 to the low pressure pump 21b as shown in Fig. 9. The push button switch 24 is arranged in the control circuit 21g to condition the power plant 21 for operation, or to terminate the overall operation thereof, whichever is desired. A pressure switch 21h which is subjected to the prevailing pressure in the booster 21d, upon actuation establishes an electrical circuit which initiates a cycle of events resulting in the cessation of high pressure fluid flow to a working tool, followed by a flow of low pressure fluid to said tool. The pressure switch 21h is adjustable for actuation at whatever maximum riveting pressure is desired.

The function of the hydraulic power plant involves three operative stages, (a) idling, (b) first part of riveting cycle, (c) second part of riveting cycle.

The idling stage is initiated by pressing the push button switch 24 to start motor 21a. As the motor turns the pump 21b, a certain amount of low pressure liquid is automatically directed by action of the pump through hose 23 (a, b, c) to the riveting tools low pressure volume to act upon the rod end 79 (a, b, c) of the piston and thus maintain each tool piston in rearward position, and at the same time excess liquid is automatically circulated back to the tank 21c. The high pressure volumes of the riveting tools are in connection with tank 21c by way of hose 22 (a, b, c), distributing valve 21e and/or booster 21d. Liquid is also being circulated from the pump through both solenoid valves 21f (1, 2) and back to the pump.

Assume now that the switch 80c of tool C is closed, initiating the first part of the tool riveting cycle. Electrical circuits are established resulting in the operation of solenoid valve 21f2, thereby directing low pressure liquid to the distributing valve 21e, which is then conditioned to pass liquid therethrough from the booster 21d to the high pressure volume of tool C by way of hose 22c to act upon the head end 78c of the piston and move the latter forwardly so that the plunger approaches the yoke 83c. During the early part of this stage, or more precisely, until the riveting tool plunger contacts the work piece, the liquid flowing from the booster 21d is at substantially the same pressure as delivered by the pump 21b, however as soon as the plunger contacts the work piece, and the resistance to further movement of the plunger increases, a valve is automatically shifted within the booster whereupon the pressure of liquid flowing therefrom is greatly intensified. When the rivet is set, the liquid pressure in the booster sharply rises at which point the pressure switch 21h is actuated to form a circuit which functions to end the first stage of the tool riveting cycle.

During the third stage, which is the second part of the riveting cycle, the booster 21d by means of an internal valve mechanism (not shown), is automatically moved to discontinue the pressurization of the liquid and allow liquid to flow therethrough from the high pressure volume of riveting tool C by way of hose 22c and the distributor valve 21e, back to the tank 21c, while at the same time low pressure liquid from pump 21b is caused to flow into the low pressure volume of riveting tool C by way of hose 23c, to act upon the rod end 79c of the piston to thus return the riveting piston to original position. Upon completion of the second part of the riveting cycle, the power plant automatically reverts to idling condition, after which the switch 80c must be released and again closed if a subsequent riveting cycle is desired.

The mechanism of the power plant is so arranged that a tool riveting cycle does not have to be completed each time the switch 80c is closed; the rivet piston can be started or stopped at any point during the operative stages b or c by merely manipulating switch 80c.

If it is desired to investigate in minute detail the structure of a power plant similar to power plant 21 described herein, reference is made to instruction booklet D-158, entitled "Hydraulic Power System," and published by the Chicago Pneumatic Tool Co. of New York, N. Y.

The operating cycle of riveting tools A or B is identical to that of tool C, as set forth above, it being understood that the functions of control element 20 is to establish operative connection between either riveting tool A or B with the hydraulic power plant 21. As heretofore mentioned, only one riveting tool can operate at a time, the tool upon which the switch 80 (a, b, c) is first closed having priority on a complete riveting cycle, to the exclusion of all the other riveting tools associated with the same hydraulic power plant.

It should be apparent that the structure of the control element 20 may be modified for the control of more than two riveting tools, without the exercise of inventive effort or without departing from the spirit of the invention, and, further that it may be feasible to apply more than one of said control elements to a single hydraulic power plant so that the number of riveting tools associated with the power plant may be increased by more than the number used in the illustration of the invention.

What is claimed is:

1. A mechanical system comprising, a hydraulic power plant including a motor, a pressure fluid pump driven by said motor, a tank arranged to supply and receive fluid used in the hydraulic power plant, a booster for intensifying the pressure of fluid delivered from said pump, a distributing valve connected with said booster, an electric control circuit comprising elements which regulate the operation of the power plant and including solenoid valves adapted upon application of electrical excitation thereto for the actuation of said distributing valve, and a pressure switch for regulating the maximum pressure attainable in said booster; a plurality of tools connected with the hydraulic power plant, each having a piston arranged in a cylinder so that a head end of the piston forms a part of a high pressure volume and a rod end of the piston forms part of a low pressure volume, and an electric switch, the low pressure volumes of the tools being directly connected to the pump; and a control element adapted to selectively connect the high pressure volume of either of two tools with the distributing valve so that high pressure fluid can be admitted to the high pressure volume and act upon the head end of the piston to cause movement thereof, and to simultaneously establish connection between the switch of the tool connected with the distributing valve and the electric control circuit.

2. A control element comprising a fluid valve portion having a fluid inlet and a plurality of fluid outlets, a valve chamber interposed between said inlet and said outlets, and a valve positionable in said valve chamber to establish connection between said valve chamber and one of the fluid outlets and simultaneously between two other fluid outlets, a switch housing portion having a plurality of electric switches each having a switch actuating plunger, and a shaft having a valve positioning means, a switch plunger contacting means, a shaft holding means, and a handle arranged exterior said portions and adapted for the rotational movement of said shaft in either of two extremes, the first of which positions said valve to establish connection between said valve chamber and a first fluid outlet and simultaneously causes the switch plunger contacting means to affect closure of a first switch, the second of which positions said valve to establish connection between said valve chamber and a second fluid outlet and simultaneously causes the switch plunger contacting means to effect closure of a second switch.

3. In a mechanical system including a pressure fluid power plant and a plurality of pressure fluid operated tools each having a switch means connectable with an electrical system of the power plant and operable when so connected to initiate actuation of the power plant to deliver pressure fluid, a control element for selectively establishing operative connection between one of the tools and the power plant, said control element comprising a fluid valve portion having a fluid inlet connected to a high pressure side of the power plant, a fluid exit connected to a low pressure side of the power plant, and a plurality of fluid outlets each connected to a tool, a valve arranged within the valve portion and movable to a plurality of positions one of which connects the fluid inlet with a fluid outlet leading to a first tool and simultaneously connects the fluid exit with a fluid outlet leading from another tool, a second position of which connects the fluid inlet with a fluid outlet leading to a second tool and simultaneously connects the fluid exit with a fluid outlet leading from another tool, a switch portion having a plurality of switch means each operative to connect a tool switch with the power plant electrical system, and a shaft means to move said valve and simultaneously operate one of said switches whereby one of said tools is conditioned to receive pressure fluid from the power plant.

4. A control element comprising a fluid valve portion having fluid passageways including a fluid inlet, a fluid return passageway, and a plurality of fluid outlets, a valve chamber interposed between the fluid passageways, a disc valve in said valve chamber movable to two positions either of which connects the fluid inlet with a fluid outlet and simultaneously connects the fluid return passageway with the other fluid outlet, a switch housing portion, a pair of electric switches in said switch housing portion and each having a switch actuating plunger, a shaft positioned in part within each of said portions and having a handle exterior said portions for the positional movement thereof, the section of the shaft within the valve portion being arranged to couple with said disc valve, the section of the shaft within the switch housing portion having a pair of cams arranged for the alternate operation of said switches by way of said switch plungers, and a shaft holding means for maintaining the shaft in either of said two positions.

5. A control element according to claim 4 in which said holding means comprises a plunger which is constantly urged against the side of said shaft by means of a compression spring, and maintains said shaft in either of two positions by cooperation with two flat portions symmetrically disposed on the periphery of said shaft.

6. A control element according to claim 5 in which the shaft is coupled to the disc valve by way of a crank and in which said handle is adapted to receive a pivotal means for connection with a rod for manipulation of said handle at a remote distance therefrom.

ERNEST BERGER.

REFERENCES CITED

The following references are of record in the file of this patent:

UNITED STATES PATENTS

| Number | Name | Date |
| --- | --- | --- |
| 2,233,944 | Genda | Mar. 4, 1941 |
| 2,245,369 | Smith | June 10, 1941 |
| 2,275,471 | Samiran | Mar. 10, 1942 |
| 2,355,997 | Mueller et al. | Aug. 15, 1944 |
| 2,398,007 | Hunter | Apr. 9, 1946 |
| 2,431,944 | Lauck | Dec. 2, 1947 |
| 2,456,125 | Johndrew | Dec. 14, 1948 |